United States Patent
Choudhury et al.

(10) Patent No.: US 12,206,554 B2
(45) Date of Patent: Jan. 21, 2025

(54) INTELLIGENT CONTROLLER FOR SMART NICs AND HARDWARE ACCELERATORS

(71) Applicant: MICROSOFT TECHNOLOGY LICENSING, LLC, Redmond, WA (US)

(72) Inventors: Rupam Choudhury, Jackson, NJ (US); Mukesh Dua, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 301 days.

(21) Appl. No.: 17/705,132

(22) Filed: Mar. 25, 2022

(65) Prior Publication Data

US 2023/0308354 A1 Sep. 28, 2023

(51) Int. Cl.
*H04L 41/0893* (2022.01)
*H04L 41/0803* (2022.01)
*H04L 49/109* (2022.01)

(52) U.S. Cl.
CPC ...... *H04L 41/0893* (2013.01); *H04L 41/0803* (2013.01); *H04L 49/109* (2013.01)

(58) Field of Classification Search
CPC ....... G06F 2009/45595; G06F 9/45558; H04L 41/046; H04L 41/0803; H04L 41/0893; H04L 41/0894; H04L 41/0895; H04L 41/342; H04L 41/40; H04L 45/38; H04L 45/645; H04L 47/125; H04L 49/109
See application file for complete search history.

(56) References Cited

U.S. PATENT DOCUMENTS

| 11,102,164 | B1 | 8/2021 | Gupta et al. |
| 11,323,487 | B1 * | 5/2022 | Miriyala ............ H04L 63/0263 |
| 2022/0393974 | A1 * | 12/2022 | Wen ................... H04L 45/54 |

FOREIGN PATENT DOCUMENTS

| KR | 101579006 B1 | 12/2015 |
| WO | 2016003398 A1 | 1/2016 |

OTHER PUBLICATIONS

Le, et al., "UNO: Unifying Host and Smart NIC Offload for Flexible Packet Processing", In Proceedings of the Symposium on Cloud Computing, Sep. 24, 2017, pp. 506-519.
"International Search Report and Written Opinion Issued in PCT Application No. PCT/US2023/010015", Mailed Date: Apr. 3, 2023, 14 Pages.

* cited by examiner

*Primary Examiner* — Mansour Oveissi
(74) *Attorney, Agent, or Firm* — Han Gim; Newport IP, LLC

(57) ABSTRACT

Techniques are disclosed for configuring a hardware-based networking device in a virtualized computing network comprising a plurality of servers hosting virtual machines. The hardware-based networking device is configured to provide network interfaces for virtual machines hosted on the plurality of servers to enable virtual network communications within a virtual network in accordance with associated policies that are applied by the hardware-based networking device.

20 Claims, 7 Drawing Sheets

INTELLIGENT CONTROLLER FOR SMART NICs AND HARDWARE ACCELERATORS

BACKGROUND

Service providers may utilize data centers and edge sites that house computer systems and various networking, storage, and other related components. Service providers may, for example, provide computing services to businesses and individuals as a remote computing service or provide "software as a service" (e.g., cloud computing). Software defined networking (SDN) enables centralized configuration and management of physical devices and virtual sources as well as dynamic and scalable implementation of network policies. The efficient processing of data traffic and efficiently utilizing the physical and virtual network resources are important for maintaining scalability and efficient operation in such networks.

It is with respect to these considerations and others that the disclosure made herein is presented.

SUMMARY

Many cloud architectures offload networking stack tasks related to implementation of policies such as tunneling for virtual networks, security, and load balancing. By offloading packet processing tasks to hardware devices such as a network interface card (NIC) and/or a field programmable gate array (FPGA), the capacity of CPU cores can be reserved for running cloud services and reducing latency and variability of network performance. In one example, a computing rack of a cloud service provider may have at least one top-of-rack (ToR) switch (two or more if redundancy is provided) and a number of servers, where each of the servers may have a NIC. In some embodiments, a NIC that is capable of processing networking stack tasks may be referred to as a smart NIC. A smart NIC may allow a virtual machine (VM) to talk to any other VM through various types of virtual tunnelling mechanisms. This may ensure that a virtual network can be instantiated in which all data communications are contained within the virtual network's boundaries and that no other customer's VMs can access the virtual network. Through application of policies, each VM can be programmed to communicate with other VMs within its virtual network with a series of complex policies. These VMs can be on the same machine or a different machine, and even in another datacenter. The policies can be complex and numerous and require a high level of processing and memory associated with their implementation.

One challenge in the implementation of such virtual networks is the efficient processing of new flows by the packet processing pipeline without significantly impacting the network throughput or latency. Another challenge is the process by which cloud providers today configure a smart NIC. Cloud providers may develop various types of tooling to configure the smart NICs upfront at the time of server deployment, with generic configurations (that are not application specific) on the smart NIC. Another approach to configuring a smart NIC is to provide privileged access to applications (e.g., customer owned network function workloads), which then configures the smart NIC during its execution. There are some downsides to each of these approaches. Configuration of smart NICs at the time of server deployment can only be performed based on the best available information at the time of deployment. When new flows need to be supported, the smart NICs will not be configured to support the new flows. Providing privileged access to applications may have security issues as well as inconsistent implementations.

To address the above concerns and other shortcomings, the present disclosure describes an intelligent controller for smart NICs that may be situated in a centralized location in a data center. The intelligent controller may manage the configuration of programmable IO devices such as smart NICs during deployment. In an embodiment, the smart NICs may be configured based on workload type. Data flows can be added to the intelligent controller for each application type and at the time of application deployment, the intelligent controller can send respective flows to a privileged agent running on the server that is associated with a given smart NIC. The privileged agent may configure the smart NICs with the flows.

The described techniques can allow for virtual computing environments to support a variety of configurations while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1A:
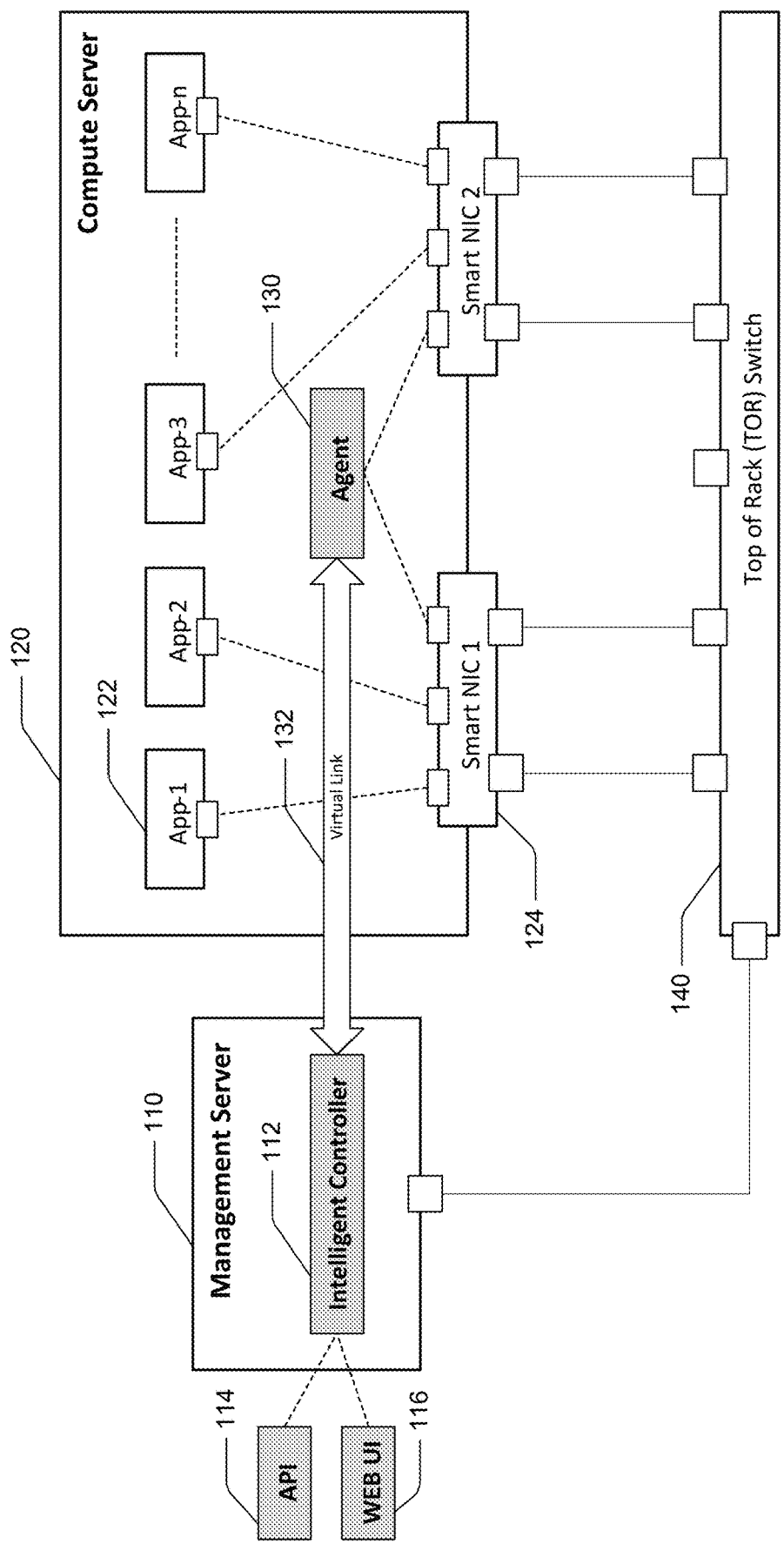
FIG. 1A is a diagram illustrating an example architecture in accordance with the present disclosure.

A network such as a software defined network (SDN) may have one or more devices that process inbound and outbound packet traffic, transform the packets by applying policies to the packets, and forward the packets to respective destinations. Such processes may include applying a packet processing graph to the packet traffic which may comprise, for example, checking the content of a packet against a series of tables or other data structures, pattern matching against each table, and so forth.

When a new flow starts (e.g., a flow defined by the source and destination address of a data packet), the processing device may modify one or more rows in one or more tables of the packet processing graph to treat that new flow with specified rules that are applicable for that flow (e.g., perform network address translation). Such a process may include, for example, capturing a data packet, identifying the packet as the first packet of a flow, placing the packet in a queue, sending the packet to a processor, parsing the packet, identifying an action, determining which tables to modify, locking the tables, applying the changes, and forwarding the packet. Such processing can consume significant computing resources such as CPU cycles and memory resources. Application of the applicable policy can be offloaded to a first smart NIC for processing of subsequent packets. However, if a second smart NIC encounters a packet that has already been established elsewhere, the second smart NIC may not have the flow information as the first smart NIC, and the packet must be processed as though it were the first packet of the flow. Such additional processing can introduce latency which can result in delays and/or missing subsequent data packets in the flow.

Thus one challenge faced by many cloud providers is the ability to process new flows by executing the packet processing pipeline without significantly impacting the network throughput or latency. Another challenge faced by cloud providers is the process for configuring a smart NIC. In some cases, cloud providers may develop tooling to configure the smart NICs upfront at the time of server deployment. The smart NICs may be configured with generic configurations that are not application specific. Another approach can be to provide privileged access to applications (customer owned network function workloads), which then configures the smart NIC during execution. There are some downsides to each of these approaches.

With regard to configuring smart NICs upfront, the flows must be pre-configured on all the servers and may require manual intervention for subsequent flow additions. Flows that are pre-configured on a smart NIC device may not be applicable to all the applications that are sending and receiving data packets. Additionally, some applications may have a need for yet another set of flows, which if not found on the switch can result in additional CPU cycles. The introduction of new applications will also require some manual configuration after the initial deployment of servers. Additionally, any changes to a flow configuration or the addition of flows will result in more work for the cloud provider to distribute the new configuration flows across multiple regions.

With regard to providing privileged access to applications, this may require privileged access to customer applications which can cause a security concern in a multi-tenant cloud environment. Applications will need privileged access to configure flows on these programmable IO devices. Any additional flows required on after deployment may require manual configurations on each server and/or cloud region.

To address the above concerns and other shortcomings, the present disclosure describes an intelligent controller for hardware accelerators and smart NICs. As used herein, hardware accelerators, smart NICs, and other such programmable devices that can process offloaded networking tasks may generally be referred to herein as programmable network interface devices. In an embodiment, the intelligent controller may be situated in a centralized location in a data center or a group of data centers. The intelligent controller may manage the configuration of programmable IO devices such as smart NICs. In an embodiment, the programmable IO devices may be configured based on workload type. New flows can be added to the intelligent controller for each application type and at the time of application deployment, the intelligent controller can send respective flows to a privileged agent running on the server that is associated with a given smart NIC.

A number of use cases can be enabled by implementation of the disclosed embodiments. In one example, application specific configurations may be configured on the programmable IO devices, where the data flows may be primed based on application characteristics. The intelligent controller may be application aware via the agents running on the servers hosting the applications. For example, the agents and the intelligent controller may determine if tunnel offloads are needed and can intelligently push the appropriate tasks to the smart NIC when the intelligent controller detects the need on the host.

In some embodiments, the intelligent controller can provide enhanced security by reprogramming smart NICs when a threat vector for a malicious flow is identified. By dynamically reprogramming the smart NICs in this way, threats can be stopped at the smart NICs before spreading further in the network.

In some embodiments, the intelligent controller can enable integration with logging and monitoring functions. For example, the intelligent controller may access statistics from the smart NICs for various metrics such as what flows have been offloaded, what hardware counters are measured, what are the counters, bits, errors, CPU utilization, etc. The data can be extracted and pushed to the intelligent controller to enable centralized consolidation of this data. The intelligent controller can also provide advanced failure detection capabilities by communicating directly with the smart NICs via the agents.

In some embodiments, the intelligent controller can allow session synchronization between multiple programmable devices within a host. For example, two or more smart NICs may have asymmetric traffic flows and may become out of sync over time. The intelligent controller may perform session synchronization by comparing flow tables of the two smart NICs.

In some embodiments, the intelligent controller can facilitate seamless and hitless replication of session data to other host devices (assuming another instance is running on other host devices).

In some embodiments, the intelligent controller can provide the ability for the intelligent controller and agent to work in a vendor-agnostic manner. In an embodiment, the intelligent controller and agent may be configured to work with any accelerator device from any supplier. In an embodiment, an abstraction layer may be implemented that enables the intelligent controller to interact with devices from different accelerator vendors. The abstraction layer enables the service provider to be agnostic as to the specific underlying differences between accelerators such as smart NICs. The abstraction layer can alleviate the need for individual users and applications from having to configure and program smart NICs and configure VLAN details. The intelligent controller can interact with the back-end orchestration mechanism, and provide a catalog of VNFs and CNFs that may be utilized for configuration processes.

In one example, the intelligent controller may be used to enable efficient setup of VXLAN tunnels for overlay networks, the manual setup of which can be complex. In an embodiment, the intelligent controller may be configured to set up dynamic VXLAN tunnels across multiple host servers and discover multiple hosts for dynamically creating overlay networks.

In some embodiments, the intelligent controller may further enable the intelligent adjustment of QoS settings and bandwidth settings in a distributed and a homogeneous fashion among the smart NICs. For example, the intelligent controller may adapt to bandwidth limitations, or allocate different portions of bandwidth to different VLANs, which can be accomplished by configuring the smart NICs to process selected flows to enable various QoS and/or bandwidth settings.

The intelligent controller may provide a centralized point in the network for intelligently maintaining data flows, making application-aware changes, and priming smart NICs as needed. The intelligent controller provides programming interfaces to the smart NICs and automates the configuration of smart NICs to reduce programming overhead.

In some embodiments, the intelligent controller can be placed in a network in a flexible manner based on the architecture and deployments in the network. The intelligent controller can be containerized and can be run centrally, regionally, or in a local deployment. For example, the intelligent controller can be executed on a management server with an intelligent agent running on each server. In some embodiments, a federation of intelligent controllers can be deployed to provide a distributed approach to intelligently controlling smart NICs and other programmable devices.

By providing such an intelligent controller, the need to pre-configure programmable IO devices and/or provide privileged access to customers may be reduced. At the same time, the intelligent controller allows for efficient implementation of post-deployment configuration changes in a parallel fashion rather than having to individually implement changes to every instance of an application.

The intelligent controller provides a single point in the network for maintaining flows with respect to each application type. The intelligent controller can also reduce the number of unnecessary flows on the servers and the flows are configured only on programmable IO devices consumed by the application. The intelligent controller enables automated configuration of programmable IO devices during application deployment.

The intelligent controller may reduce the use of processing cycles on servers while adding new flows. Flows can be configured directly through the intelligent controller and agents which pre-programs the NIC before an application is fully deployed. Any post-deployment changes to application flows can be made in a central controller database which can then control the configuration on all impacted programmable IO devices. This greatly reduces the amount of manual effort needed for the cloud provider and/or customer to configure the flows on all application instances. The intelligent controller further allows for improved observability by enabling integration with logging and monitoring capabilities by the intelligent controller.

Referring to the appended drawings, in which like numerals represent like elements throughout the several FIGURES, aspects of various technologies for an intelligent controller and supporting technologies will be described. In the following detailed description, references are made to the accompanying drawings that form a part hereof, and which are shown by way of illustration specific configurations or examples.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types of hardware acceleration devices, etc.

The disclosed embodiments enable datacenters to provide services in a manner that can enhance system flexibility and efficiency while reducing cost and complexity, allowing for more efficient use of computing, storage, and network resources. Efficient implementation of the end-to-end services by a cloud service provider can enable an experience that is seamless and more consistent across various footprints.

FIG. 1A illustrates an example computing environment in which the embodiments described herein may be implemented. FIG. 1A illustrates an intelligent controller 112 that may be situated in a centralized location such as in management server 110. The intelligent controller 112 may manage the configuration of programmable IO devices such as smart NICs 124 based on workload type. The flows can be added to the intelligent controller 112 for each application type and at the time of application deployment, the intelligent controller 112 can send respective flows to a privileged agent 130 running on a compute server 120 that is associated with smart NICs 124. The intelligent controller 112 can communicate with privileged agent 130 via a secure virtual link 132.

In some embodiments, an API 114 may be implemented to enable the service provider to communicate with the intelligent controller 112 and add new flows and/or provide updated flow information and the like. Additionally, a web UI 116 may be provided to enable observation of statistics and other data that may be observable via data collection by intelligent controller 112. By controlling the smart NICs 124 by the intelligent controller 112, the smartNICs 124 may efficiently process current and new flows for applications 122 running on compute server 120 that are entering or leaving the compute server 120 via top of rack (ToR) switch 140.

In an embodiment, the intelligent controller 112 may store a catalog or database of flow data for known flows, allowing the intelligent controller 112 to configure the smart NICs to process known flows. By allowing the ability to configure smart NICs in this dynamic manner, the number of connections that the smart NICs can support can be increased. Thus a single smart NIC may be used to support multiple services, allowing for more efficient data center layouts. In an embodiment, the agent 130 may be implemented as software running on compute server 120 and configured to communicate to intelligent controller 112 to receive instructions and data for configuring the smart NICs 124.

Figure 1B:
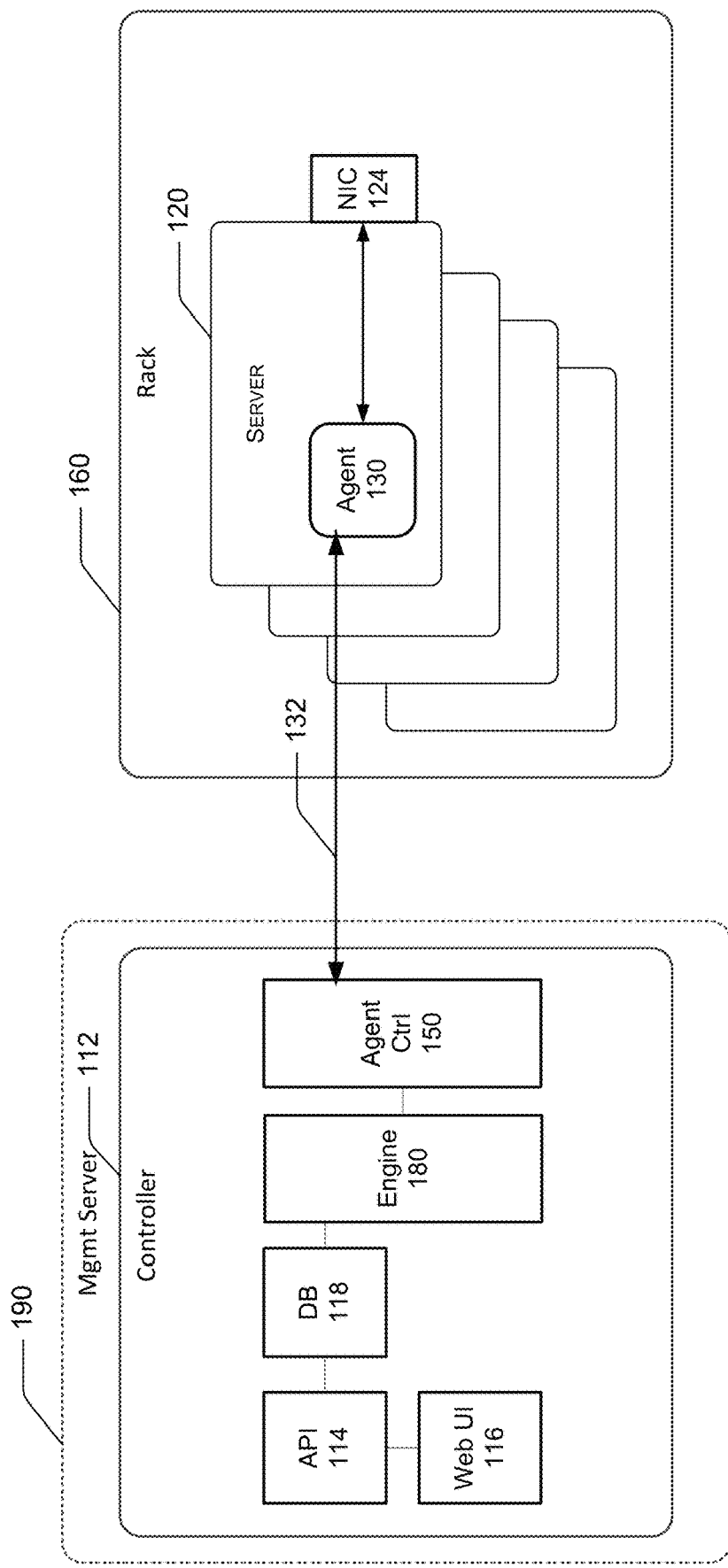
FIG. 1B is a diagram illustrating an example architecture in accordance with the present disclosure.

FIG. 1B illustrates an example controller and computing environment in which the embodiments described herein may be implemented. FIG. 1B illustrates intelligent controller 112 in further detail which may be situated in a centralized location such as in management server 190. The intelligent controller 112 may manage the configuration of programmable IO devices such as smart NICs 124. Flows and other information can be sent to the intelligent controller 112 via API 114 and may be stored in database 118. The intelligent controller 112 may store a catalog or database of flow data for known flows in database 118, allowing the intelligent controller 112 to configure the smart NICs 124 to process known flows. The intelligent controller 112 may have an engine 180 that generates instructions for implementing the flows for various types of smart NICs 124. The engine 180 can provide the instructions to agent controller 150 that is configured to communicate with agents 130 running on compute servers 120. The agent controller 150 can send respective flows to agents 130 running on compute servers 120 that in some implementations may be installed in a rack 160. The compute servers 120 may each be associated with smart NICs 124. The smart NICs 124 may be aggregated and/or pooled in some embodiments, so the ratio between smart NICs 124 and compute servers 120 need not be 1:1. The intelligent controller 112 can communicate with agent 130 via a secure virtual link 132.

In some embodiments, web UI 116 may be provided to enable observation of statistics and other data that may be observable via data collection by intelligent controller 112 that are received by agent controller 150 from smart NICs 124. By controlling the smart NICs 124 by the intelligent controller 112, the smart NICs 124 may efficiently process current and new flows for applications running on compute servers 120.

Figure 2:
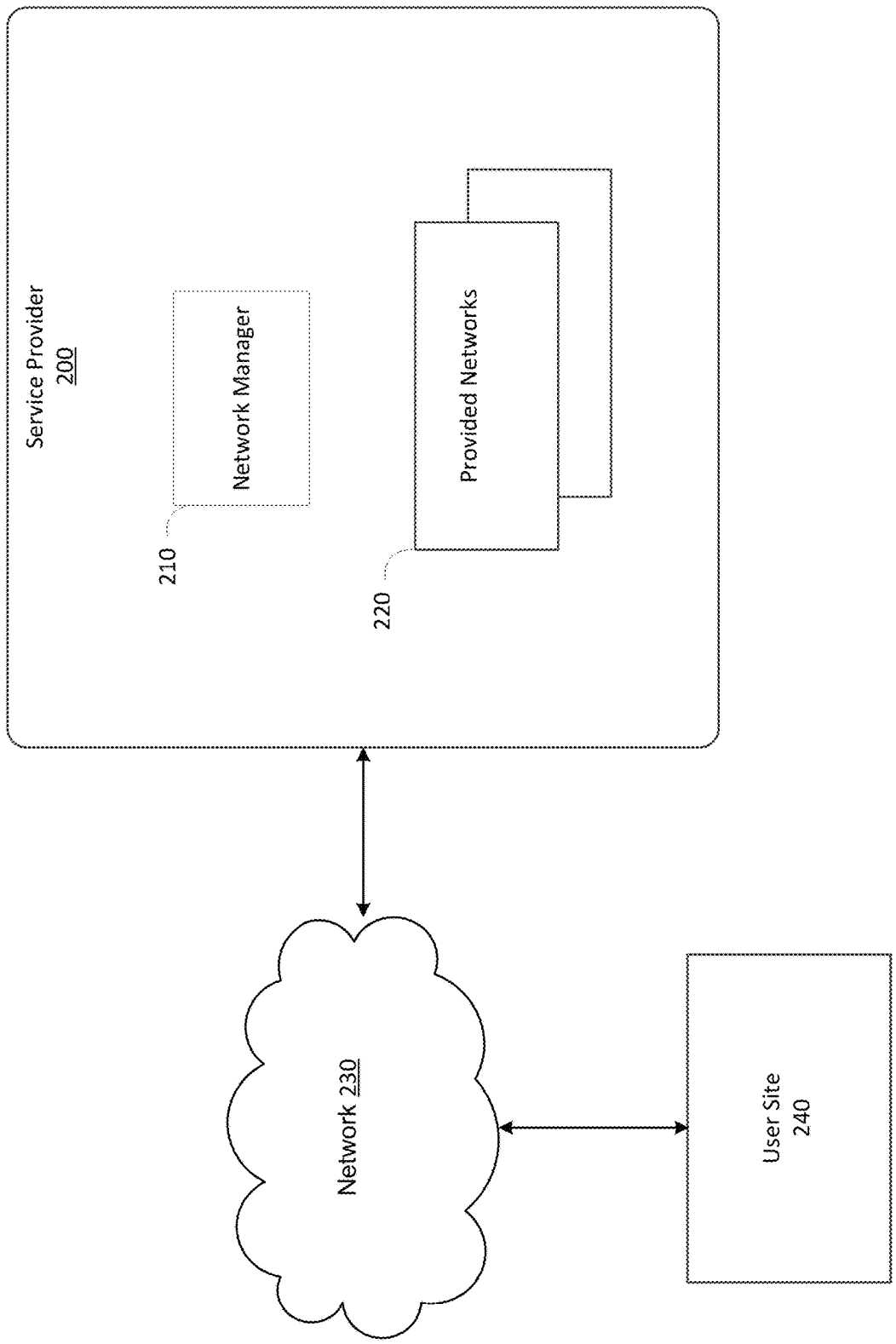
FIG. 2 is a diagram illustrating a data center in accordance with the present disclosure.

FIG. 2 illustrates an example computing environment in which the embodiments described herein may be implemented. FIG. 2 illustrates a service provider 200 that is configured to provide computing resources to users at user site 240. The user site 240 may have user computers that may access services provided by service provider 200 via a network 230. The computing resources provided by the service provider 200 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 200 may have various computing resources including servers, routers, and other devices that may provide remotely accessible computing and network resources using, for example, virtual machines. Other resources that may be provided include data storage resources. Service provider 200 may also execute functions that manage and control allocation of network resources, such as a network manager 210.

Network 230 may, for example, be a publicly accessible network of linked networks and may be operated by various entities, such as the Internet. In other embodiments, network 230 may be a private network, such as a dedicated network that is wholly or partially inaccessible to the public. Network 230 may provide access to computers and other devices at the user site 240.

Figure 3:
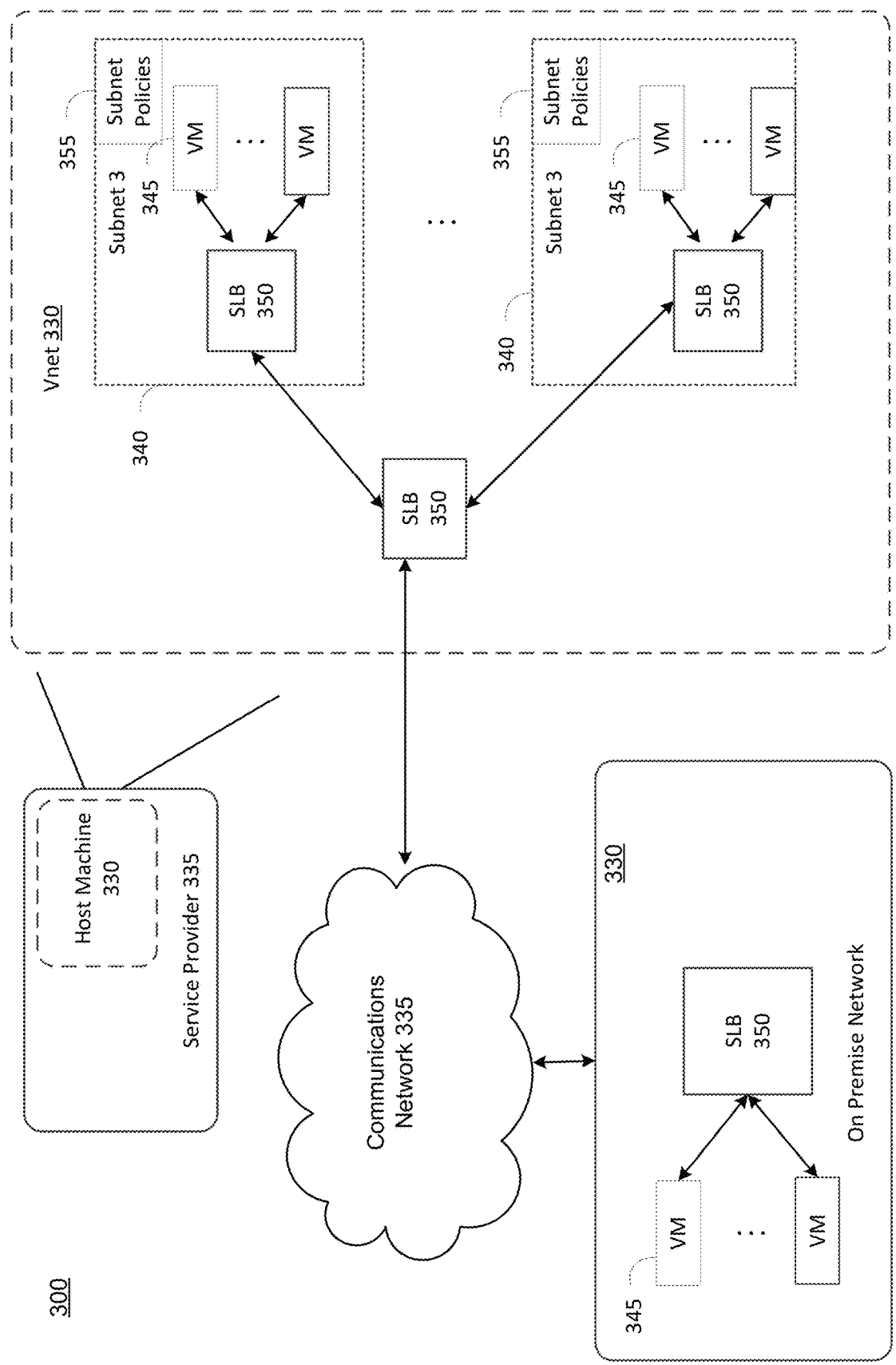
FIG. 3 is a diagram illustrating an architecture for implementing virtual services in accordance with the present disclosure.

FIG. 3 shows an illustrative cloud computing environment 300 in which a customer network includes multiple portions including an on-premises network 310 and a virtual network (VNet) 330. The customer network in this example is a hybrid network but other network configurations may also be utilized depending on the particular requirements of the user scenario. The VNet may be physically implemented using one or more host machines 330 that are operated by a cloud service provider 335. It is noted that the diagram in FIG. 3 is simplified for clarity in exposition and typical networking equipment such as firewalls, routers, and the like are not shown.

The on-premises network and VNet are typically operatively coupled using instances of gateways 330, or other networking devices, over a communication network 335 which may include, for example, private and/or public networking infrastructure using various combinations of connectivity services. The VNet may include multiple subnets 340 that each include one or more instances of virtual machines 345 that are typically connected using load balancers 350 and/or other networking devices. Security and other networking policies (collectively indicated by reference numeral 355) are typically applicable to each subnet. The networking policies are typically different for each subnet, but they can be the same and/or overlap in some cases.

The cloud computing environment 300 may be provided via a data center configured to provide computing resources to users via communications network 335. The computing resources provided by the data center may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

The data center may include servers that may be standalone or installed in server racks, and provide computing resources available as virtual machines 345. The virtual machines 345 may be configured to execute applications such as Web servers, application servers, media servers, database servers, and the like. Other resources that may be provided include data storage resources may include file storage devices, block storage devices, and the like. The communications network 335 may, for example, be a publicly accessible network of linked networks and may be operated by various entities, such as the Internet. In other embodiments, communications network 335 may be a private network, such as a corporate network that is wholly or partially inaccessible to the public.

Communications network 335 may provide access to various computers that may be a server, a desktop or laptop personal computer, a tablet computer, a smartphone, a set-top box, or any other computing device capable of accessing the data center.

In the example cloud computing environment 300, a network device may be utilized to interconnect the servers. The network device may comprise one or more switches, routers, or other network devices. The network device may facilitate communications within networks in the data center, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 4:
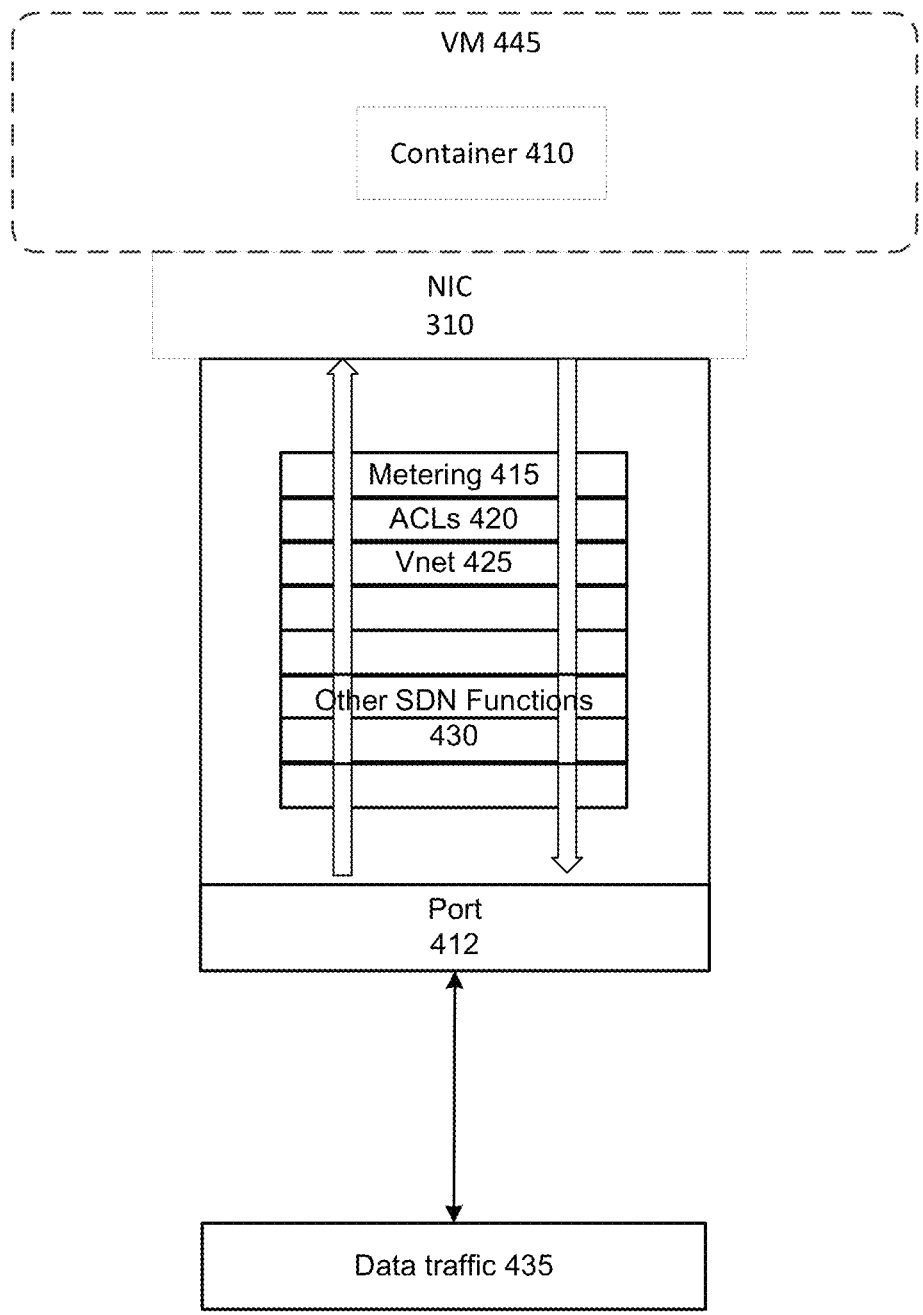
FIG. 4 is a diagram illustrating an example architecture in accordance with the present disclosure.

FIG. 4 shows an example functional flow for a programmable connection processing and switching function 400 that enables data path isolation in a multi-tenant architecture by enforcing specific networking policies, which may be implemented in a smart NIC as further described herein. The programmable connection processing and switching function 400 may provide capabilities to enforce policies and transform or tunnel data packets in a given computing workload that are entering and leaving VM 445. Case connections or flows are created by the programmable hardware of the programmable connection processing and switching function 400 and entered into a flow table that allows that connection/flow to be switched/encapsulated without the same inspection.

The networking policy functions may include those, in this example, relating to metering 415, access control lists (ACLs) 420, VNet addressing/routing 425, and other various SDN functions or features 430 which may include, for example, those pertaining to routing, tunneling, filtering, address translation, encryption, decryption, encapsulation, de-encapsulation, or quality of service (QOS). Data traffic 435 may enter/exit programmable connection processing and switching function 400 via port 412.

Figure 5:
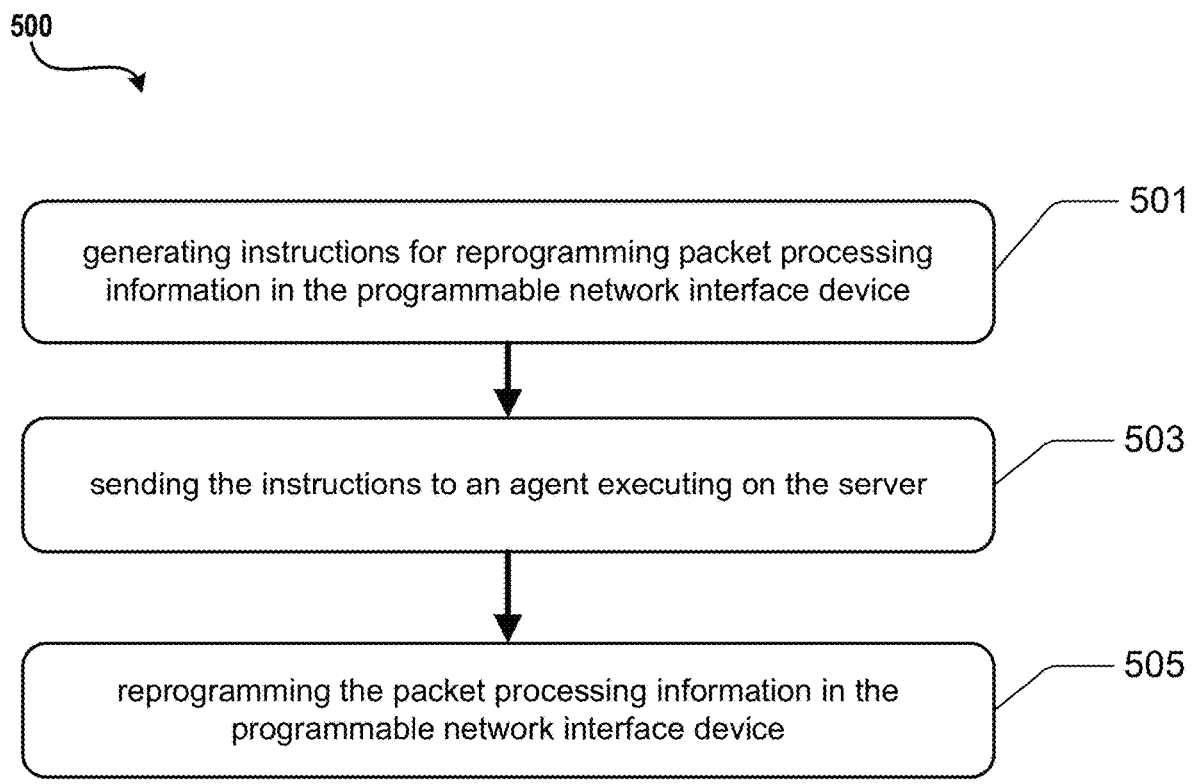
FIG. 5 is a flowchart depicting an example procedure in accordance with the present disclosure.

Turning now to FIG. 5, illustrated is an example operational procedure for configuring a programmable network interface device in a virtualized computing system comprising a virtual machine hosted on a server. In an embodiment, the programmable network interface device configured to provide network interfaces for the virtual machine to enable virtual network communications in accordance with policies associated with a virtual network implemented in the virtualized computing system. Such an operational procedure can be provided by one or more components illustrated in FIGS. 1 through 4. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 500 is described as running on a system, it can be appreciated that the routine 500 and other operations described herein can be executed on an individual computing device or several devices.

Referring to FIG. 5, operation 501 illustrates generating, by a controller executing on a computing device communicatively coupled to the server, instructions for reprogramming packet processing information in the programmable network interface device while the programmable network interface device is in service. In an embodiment, the packet processing information is for a data flow having a source in the virtual network or a destination in the virtual network. In an embodiment, the data flow is associated with an application deployed in the virtual network.

Operation 501 may be followed by operation 503. Operation 503 illustrates sending, by the controller, the instructions to an agent executing on the server. In an embodiment, the server is associated with the programmable network interface device and the agent is configured to communicate with the controller to configure the programmable network interface device while the programmable network interface device is in service.

Operation 503 may be followed by operation 505. Operation 505 illustrates based on the instructions, reprogramming, by the agent, the packet processing information in the programmable network interface device. In an embodiment, the packet processing information is usable by the programmable network interface device to process packets of the data flow associated with the application deployed in the virtual network.

Figure 6:
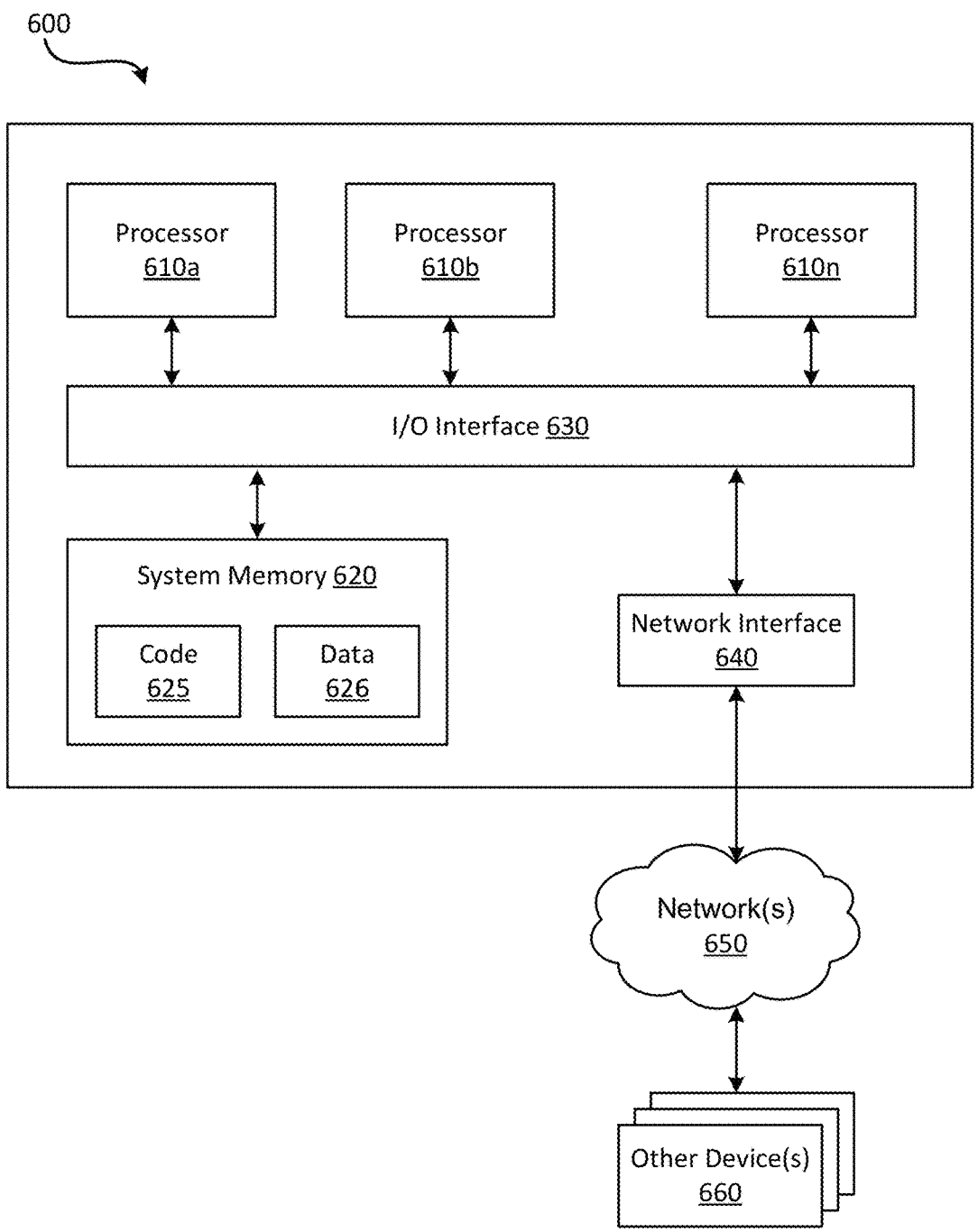
FIG. 6 is an example computing system in accordance with the present disclosure.

FIG. 6 illustrates a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 620, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 660, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for the Figures for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 6, may include other components that are not explicitly shown in FIG. 6, or may utilize an architecture completely different than that shown in FIG. 6.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for configuring a programmable network interface device in a virtualized computing system comprising a virtual machine hosted on a server, the programmable network interface device configured to provide network interfaces for the virtual machine to enable virtual network communications in accordance with policies associated with a virtual network implemented in the virtualized computing system, the method comprising:

generating, by a controller executing on a computing device communicatively coupled to the server, instructions for reprogramming packet processing information in the programmable network interface device while the programmable network interface device is in service, wherein the packet processing information is for a data flow having a source in the virtual network or a destination in the virtual network, the data flow associated with an application deployed in the virtual network;

sending, by the controller, the instructions to an agent executing on the server, wherein the server is associated with the programmable network interface device and the agent is configured to communicate with the controller to configure the programmable network interface device while the programmable network interface device is in service; and based on the instructions, reprogramming, by the agent, the packet processing information in the programmable network interface device, wherein the packet processing information is usable by the programmable network interface device to process packets of the data flow associated with the application deployed in the virtual network.

Clause 2: The method of clause 1, wherein the programmable network interface device is a smart network interface card (NIC).

Clause 3: The method of any of clauses 1-2, wherein the controller sends the instructions to the agent via a secure virtual channel.

Clause 4: The method of any of clauses 1-3, further comprising synchronizing, by the controller, flow states for two or more programmable network interface devices in the virtualized computing system.

Clause 5: The method of any of clauses 1-4, wherein the controller is a first controller, further comprising generating, by a second controller executing in the virtualized computing system, instructions for configuring additional programmable network interface devices in the virtualized computing system.

Clause 6: The method of any of clauses 1-5, wherein the first controller and second controller are configured to interact and operate as a federated system.

Clause 7: A computing device communicatively coupled to a virtualized computing system comprising a plurality of servers hosting virtual machines, the computing device comprising a processor and a memory storing computer executable instructions that, when executed by the processor, cause the computing device to perform operations comprising:

generating instructions for programming packet processing information in a programmable network interface device, wherein the packet processing information is for a data flow having a source from or destination to an endpoint in a virtual network of the virtualized computing system, the programmable network interface device configured to provide network interfaces for virtual machines hosted on the plurality of servers to enable virtual network communications within a virtual network in accordance with associated policies that are applied by the programmable network interface device; and sending, the instructions to an agent executing on a server associated with the programmable network interface device, wherein the instructions are operable to program, by the agent, the packet processing information in the programmable network interface device while the programmable network interface device is in service, wherein the packet processing information is usable by the programmable network interface device to process packets of the data flow associated with an application deployed in the virtual network.

Clause 8: The system of clause 7, further comprising computer executable instructions that, when executed by the processor, cause the computing device to instantiate an API operable to receive electronic requests to generate the instructions for configuring the programmable network interface device.

Clause 9: The system of any of clauses 7 and 8, further comprising computer executable instructions that, when executed by the processor, cause the computing device to receive, from the agent, statistics pertaining to operation of the programmable network interface device.

Clause 10: The system of any clauses 7-9, further comprising computer executable instructions that, when executed by the processor, cause the computing device to generate instructions for configuring the programmable network interface device to stop processing packets that have been identified as a security threat.

Clause 11: The system of any clauses 7-10, further comprising computer executable instructions that, when executed by the processor, cause the computing device to generate instructions for configuring the programmable network interface device to update packet processing information based on applications running on the plurality of servers.

Clause 12: The system of any clauses 7-11, wherein the programmable network interface device is a smart NIC.

Clause 13: The system of any clauses 7-12, wherein the instructions are sent to the agent via a secure virtual channel.

Clause 14: The system of any clauses 7-13, further comprising computer executable instructions that, when executed by the processor, cause the computing device to generate instructions for configuring two or more programmable network interface device to synchronize flow states in the virtualized computing system.

Clause 15: A computer-readable storage medium having computer-executable instructions stored thereupon which, when executed by one or more processors of a computing device, cause the computing device to perform operations comprising:

generating instructions for updating packet processing information in a programmable network interface device, wherein the packet processing information is for a data flow having a source from or destination to an endpoint in a virtual network of a virtualized computing system, the virtualized computing system comprising a plurality of servers hosting virtual machines, the programmable network interface device configured to provide network interfaces for virtual machines hosted on the plurality of servers to enable virtual network communications within a virtual network in accordance with associated policies that are applied by the programmable network interface device; and sending, the instructions to an agent executing on a server associated with the programmable network interface device, wherein the instructions are operable to update, by the agent, the packet processing information in the programmable network interface device while the programmable network interface device is in service and process packets in accordance with the updated packet processing information.

Clause 16: The computing environment of clause 15, further comprising computer executable instructions that, when executed by the one or more processors of a computing device, cause the computing device to instantiate an API operable to receive electronic requests to generate the instructions for configuring the programmable network interface device.

Clause 17: The computing environment of any of clauses 15 and 16, further comprising computer executable instructions that, when executed by the one or more processors of a computing device, cause the computing device to generate instructions for configuring the programmable network interface device to stop processing packets that have been identified as a security threat.

Clause 18: The computing environment of any of the clauses 15-17, further comprising computer executable instructions that, when executed by the one or more processors of a computing device, cause the computing device to generate instructions for updating the packet processing information based on applications running on the plurality of servers.

Clause 19: The computing environment of any of the clauses 15-18, further comprising computer executable instructions that, when executed by the one or more processors of a computing device, cause the computing device to generate instructions for synchronizing flow states for two or more programmable network interface devices in the virtualized computing system.

Clause 20: The computing environment of any of the clauses 15-19, further comprising computer executable instructions that, when executed by the one or more processors of a computing device, cause the computing device to instantiate a user interface operable to:
  to receive, from the agent, statistics pertaining to operation of the programmable network interface device; and
  receive electronic requests to access the statistics.

What is claimed is:

1. A method for configuring a plurality of programmable network interface devices in a virtualized computing system comprising a plurality of virtual machines hosted on a plurality of servers, the programmable network interface devices configured to provide network interfaces for the virtual machines to enable virtual network communications in accordance with policies associated with virtual networks implemented in the virtualized computing system, the method comprising:
  generating, by a centralized controller executing on a computing device separate from and communicatively coupled to the plurality of servers, instructions for reprogramming packet processing information in the programmable network interface devices while the programmable network interface devices are in service, wherein the packet processing information is for a data flow having a source in the virtual network or a destination in the virtual network, the data flow associated with an application type for an application deployed in the virtual network, wherein the reprogramming comprises changes to initial configurations of the programmable network interface devices while the programmable network interface devices are in operation;
  sending, by the controller, the instructions to a plurality of agents executing on the plurality of servers, wherein the plurality of servers are different from the computing device where the controller is executing and are associated with the programmable network interface devices and the agents are configured to communicate with the controller to configure the programmable network interface devices while the programmable network interface devices are in service; and
  based on the instructions, reprogramming, by the agents, the packet processing information in the programmable network interface devices only for the programmable network interface devices that are currently processing the data flow associated with the application type for the application deployed in the virtual network.

2. The method of claim 1, wherein the programmable network interface device is a smart network interface card (NIC).

3. The method of claim 1, wherein the controller sends the instructions to the agent via a secure virtual channel.

4. The method of claim 1, further comprising synchronizing, by the controller, flow states for two or more programmable network interface devices in the virtualized computing system.

5. The method of claim 1, wherein the controller is a first controller, further comprising generating, by a second controller executing in the virtualized computing system, instructions for configuring additional programmable network interface devices in the virtualized computing system.

6. The method of claim 5, wherein the first controller and second controller are configured to interact and operate as a federated system.

7. A computing device communicatively coupled to a virtualized computing system comprising a plurality of servers hosting a plurality of virtual machines, the computing device separate from the plurality of servers, the computing device comprising a processor and a memory storing computer executable instructions that, when executed by the processor, cause the computing device to perform operations comprising:
  generating instructions for reprogramming packet processing information in a plurality of programmable network interface devices, wherein the packet processing information is for a data flow having a source from or destination to an endpoint in a virtual network of the virtualized computing system, the data flow associated with an application type for an application deployed in the virtual network, the programmable network interface devices configured to provide network interfaces for virtual machines hosted on the plurality of servers to enable virtual network communications within a virtual network in accordance with associated policies that are applied by the programmable network interface devices, wherein the reprogramming comprises changes to initial configurations of the programmable network interface devices while the programmable network interface devices are in operation; and
  sending, the instructions to a plurality of agents executing on the plurality of servers associated with the programmable network interface devices, wherein the servers are different from the computing device and wherein the instructions are operable to reprogram, by the agents, the packet processing information in the programmable network interface devices while the programmable network interface devices are in service and only for the programmable network interface devices that are currently processing the data flow associated with an application type for an application deployed in the virtual network.

8. The computing device of claim 7, further comprising computer executable instructions that, when executed by the processor, cause the computing device to instantiate an API operable to receive electronic requests to generate the instructions for configuring the programmable network interface device.

9. The computing device of claim 8, further comprising computer executable instructions that, when executed by the processor, cause the computing device to receive, from the agent, statistics pertaining to operation of the programmable network interface device.

10. The computing device of claim 8, further comprising computer executable instructions that, when executed by the processor, cause the computing device to generate instructions for configuring the programmable network interface device to stop processing packets that have been identified as a security threat.

11. The computing device of claim 7, further comprising computer executable instructions that, when executed by the processor, cause the computing device to generate instructions for configuring the programmable network interface device to update packet processing information based on applications running on the plurality of servers.

12. The computing device of claim 7, wherein the programmable network interface device is a smart NIC.

13. The computing device of claim 7, wherein the instructions are sent to the agent via a secure virtual channel.

14. The computing device of claim 7, further comprising computer executable instructions that, when executed by the processor, cause the computing device to generate instructions for configuring two or more programmable network interface devices to synchronize flow states in the virtualized computing system.

15. A non-transitory computer-readable storage medium having computer-executable instructions stored thereupon which, when executed by one or more processors of a computing device, cause the computing device to perform operations comprising:

generating instructions for updating packet processing information in a plurality of programmable network interface devices, wherein the packet processing information is for a data flow having a source from or destination to an endpoint in a virtual network of a virtualized computing system, the data flow associated with an application type for an application deployed in the virtual network, the virtualized computing system comprising a plurality of servers hosting virtual machines, the programmable network interface devices configured to provide network interfaces for virtual machines hosted on the plurality of servers to enable virtual network communications within a virtual network in accordance with associated policies that are applied by the programmable network interface devices, wherein the updating comprises changes to initial configurations of the programmable network interface devices while the programmable network interface devices are in operation; and sending, the instructions to a plurality of agents executing on the plurality of servers associated with the programmable network interface devices, wherein the servers are different from the computing device and wherein the instructions are operable to update, by the agents, the packet processing information in the programmable network interface devices while the programmable network interface devices are in service and only for the programmable network interface devices that are currently processing the data flow associated with the application type for the application deployed in the virtual network.

16. The computer-readable storage medium of claim 15, further comprising computer executable instructions that, when executed by the one or more processors of a computing device, cause the computing device to instantiate an API operable to receive electronic requests to generate the instructions for configuring the programmable network interface device.

17. The computer-readable storage medium of claim 15, further comprising computer executable instructions that, when executed by the one or more processors of a computing device, cause the computing device to generate instructions for configuring the programmable network interface devices to stop processing packets that have been identified as a security threat.

18. The computer-readable storage medium of claim 15, further comprising computer executable instructions that, when executed by the one or more processors of a computing device, cause the computing device to generate instructions for updating the packet processing information based on applications running on the plurality of servers.

19. The computer-readable storage medium of claim 15, further comprising computer executable instructions that, when executed by the one or more processors of a computing device, cause the computing device to generate instructions for synchronizing flow states for two or more programmable network interface devices in the virtualized computing system.

20. The computer-readable storage medium of claim 15, further comprising computer executable instructions that, when executed by the one or more processors of a computing device, cause the computing device to instantiate a user interface operable to:

to receive, from the agent, statistics pertaining to operation of the programmable network interface devices; and receive electronic requests to access the statistics.

* * * * *